United States Patent
Kitaoka et al.

(10) Patent No.: US 10,848,023 B2
(45) Date of Patent: Nov. 24, 2020

(54) MOTOR CONTAINING A PERMANENT MAGNET HAVING HIGH AND LOW TEMPERATURE SIDE PERMANENT MAGNET PARTS

(71) Applicant: TDK CORPORATION, Tokyo (JP)

(72) Inventors: Hidetake Kitaoka, Tokyo (JP); Makoto Iwasaki, Tokyo (JP); Tetsuya Hidaka, Tokyo (JP); Eiji Kato, Tokyo (JP); Takuma Hayakawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 322 days.

(21) Appl. No.: 15/936,790

(22) Filed: Mar. 27, 2018

(65) Prior Publication Data

US 2018/0287441 A1 Oct. 4, 2018

(30) Foreign Application Priority Data

Mar. 30, 2017 (JP) ................ 2017-069128

(51) Int. Cl.
*H02K 1/27* (2006.01)
*H02K 1/02* (2006.01)
*H02K 9/19* (2006.01)
*H02K 7/00* (2006.01)

(52) U.S. Cl.
CPC ............ *H02K 1/2706* (2013.01); *H02K 1/02* (2013.01); *H02K 1/276* (2013.01); *H02K 9/19* (2013.01); *H02K 7/003* (2013.01)

(58) Field of Classification Search
CPC ........ H02K 1/27; H02K 1/2706; H02K 1/276; H02K 9/19; H02K 1/02; H02K 7/003
See application file for complete search history.

(56) References Cited

U.S. PATENT DOCUMENTS

| 2003/0117032 | A1* | 6/2003 | Komuro .............. H02K 15/03 310/156.08 |
| 2005/0194855 | A1* | 9/2005 | Hasebe .............. H02K 1/2793 310/156.43 |
| 2012/0025642 | A1 | 2/2012 | Onimaru et al. |
| 2012/0064259 | A1* | 3/2012 | Ohmi .................. H01J 37/3405 427/571 |
| 2013/0169098 | A1* | 7/2013 | Chamberlin .......... H02K 1/272 310/156.08 |
| 2015/0090898 | A1* | 4/2015 | Futter .................. C23C 14/562 250/423 R |
| 2016/0036276 | A1 | 2/2016 | Yamagishi et al. |

(Continued)

FOREIGN PATENT DOCUMENTS

| CN | 102396133 A | 3/2012 |
| CN | 103475123 A | 12/2013 |

(Continued)

*Primary Examiner* — Naishadh N Desai
(74) *Attorney, Agent, or Firm* — Oliff PLC

(57) ABSTRACT

Provided is a motor including a permanent magnet, in which the permanent magnet includes a high temperature side permanent magnet part exposed to a high temperature inside the motor, and a low temperature side permanent magnet part exposed to a temperature lower than the high temperature inside the motor, and a coercive force of the high temperature side permanent magnet part is higher than the coercive force of the low temperature side permanent magnet part.

20 Claims, 12 Drawing Sheets

(56) References Cited

U.S. PATENT DOCUMENTS

| | | | |
|---|---|---|---|
| 2016/0049851 A1* | 2/2016 | Hasegawa | H02K 1/276 29/598 |
| 2016/0149450 A1* | 5/2016 | Horii | H02K 1/2766 310/54 |
| 2017/0131158 A1* | 5/2017 | Matsubara | H02K 9/005 |
| 2017/0163110 A1* | 6/2017 | Hattori | H02K 9/00 |

FOREIGN PATENT DOCUMENTS

| | | | | |
|---|---|---|---|---|
| CN | 105009421 A | | 10/2015 | |
| JP | 2000-324736 A | | 11/2000 | |
| JP | 2008-125235 A | | 5/2008 | |
| JP | 2010-213516 A | | 9/2010 | |
| JP | 2015204390 A | * | 11/2015 | .......... C22C 38/002 |
| JP | 2016-012979 A | | 1/2016 | |
| JP | 2016-096181 A | | 5/2016 | |

\* cited by examiner

FIG. 1B2
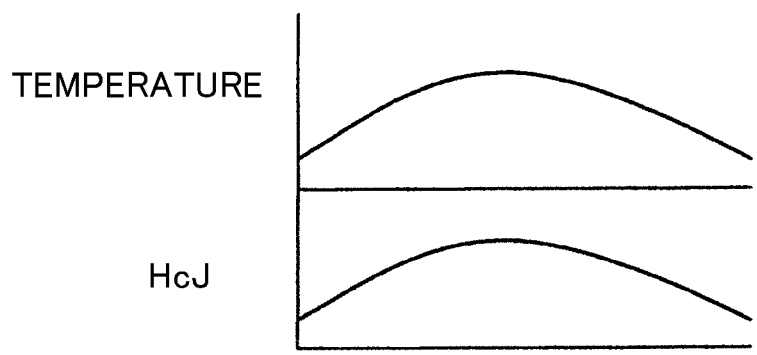
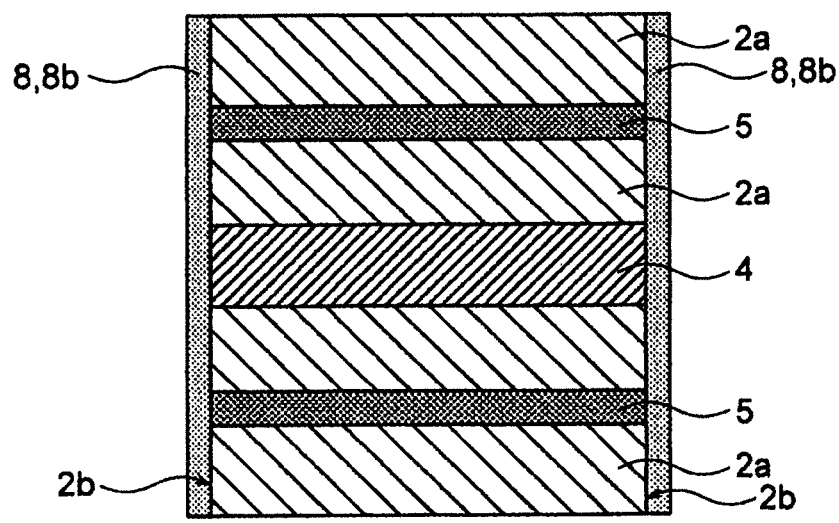
FIG. 1B1

FIG. 2B2
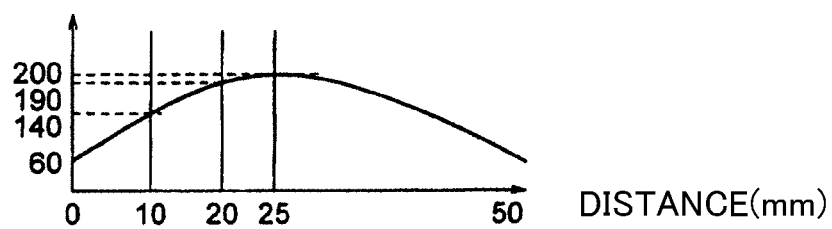
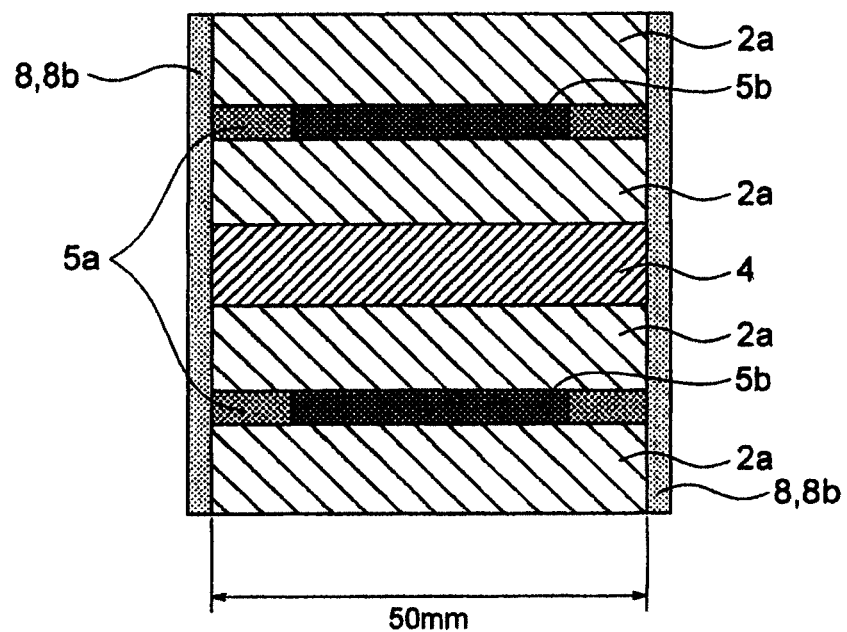
FIG. 2B1

MOTOR CONTAINING A PERMANENT MAGNET HAVING HIGH AND LOW TEMPERATURE SIDE PERMANENT MAGNET PARTS

BACKGROUND OF THE INVENTION

1. Field of the Invention

The present invention relates to a motor.

2. Description of the Related Art

As a permanent magnet in a motor using the permanent magnet, rare earth permanent magnets are actively used because high magnetic properties can be obtained. In particular, R-T-B based permanent magnets are actively used.

However, when the motor using the permanent magnets is driven, eddy currents are generated in the permanent magnets, and the temperature of the permanent magnets rises by Joule heat generated by the eddy currents. And rare earth permanent magnets, especially the R-T-B based permanent magnets, are easy to demagnetize at high temperatures because of their high temperature coefficient of coercive force. Accordingly, in the case of using the rare earth permanent magnets, particularly the R-T-B based permanent magnets as the permanent magnets, the performance of the motor is largely deteriorated due to the generation of the eddy currents.

It is possible to improve the performance of the motor by using permanent magnets with high coercive force (HcJ). However, to obtain permanent magnets having high HcJ, it is necessary to adopt a method which increases raw material cost or load during processes, leading to an increase in the cost of the permanent magnets and, consequently, the cost of the motor.

As a method for solving the above problem, for example, Patent Document 1 discloses a method of dividing permanent magnets and sandwiching an insulating layer between the permanent magnets to suppress generation of eddy currents and reduce generation of Joule heat. In addition, Patent Document 2 discloses a method for enhancing cooling by devising a route of a coolant for cooling inside of the motor.

Patent Document 1: JP-A-2000-324736
Patent Document 2: JP-A-2016-12979

SUMMARY OF THE INVENTION

The present invention has been made in view of such circumstances, and an object of the invention is to obtain a motor with a high performance and a low cost.

To achieve the above object, the motor of the present invention includes a permanent magnet, the permanent magnet includes a high temperature side permanent magnet part exposed to a high temperature inside the motor, and a low temperature side permanent magnet part exposed to a temperature lower than the high temperature inside the motor, and a coercive force of the high temperature side permanent magnet part is higher than the HcJ of the low temperature side permanent magnet part.

The motor of the invention has the above-mentioned properties. Thus, it becomes a low-cost and high-performance motor.

According to the motor of the invention, a difference between HcJ of the high temperature side permanent magnet part and the HcJ of the low temperature side permanent magnet part may be 80 kA/m or more.

According to the motor of the invention, the permanent magnet may have a distribution in the HcJ.

According to the motor of the invention, the high temperature side permanent magnet part and the low temperature side permanent magnet part may be included in the same single permanent magnet.

According to the motor of the invention, a temperature difference of 5° C. or more may be formed in the permanent magnet when using the motor.

According to the motor of the invention, the permanent magnet may be a rare earth magnet.

According to the motor of the invention, the permanent magnet may be an R-T-B based magnet.

According to the motor of the invention,
the motor may include a cooling mechanism that cools inside of the motor,
the cooling mechanism includes a coolant having a distance to the permanent magnet of 10 mm or less.

According to the motor of the invention, the coolant may be an oil.

According to the motor of the invention, the motor may be an IPM motor.

BRIEF DESCRIPTION OF THE DRAWINGS

FIG. 1B1 is a schematic sectional view of the rotor viewed along the axial direction of the rotor in FIG. 1A.

FIG. 1B2 is a graph showing temperature distribution and HcJ distribution of the permanent magnet along the rotor of FIG. 1B1.

FIG. 2B1 is a schematic sectional view of the rotor viewed along the axial direction of the rotor in FIG. 2A.

FIG. 2B2 is a graph showing temperature distribution of the permanent magnet along the rotor of FIG. 2B1.

EMBODIMENTS

Figure 1A:
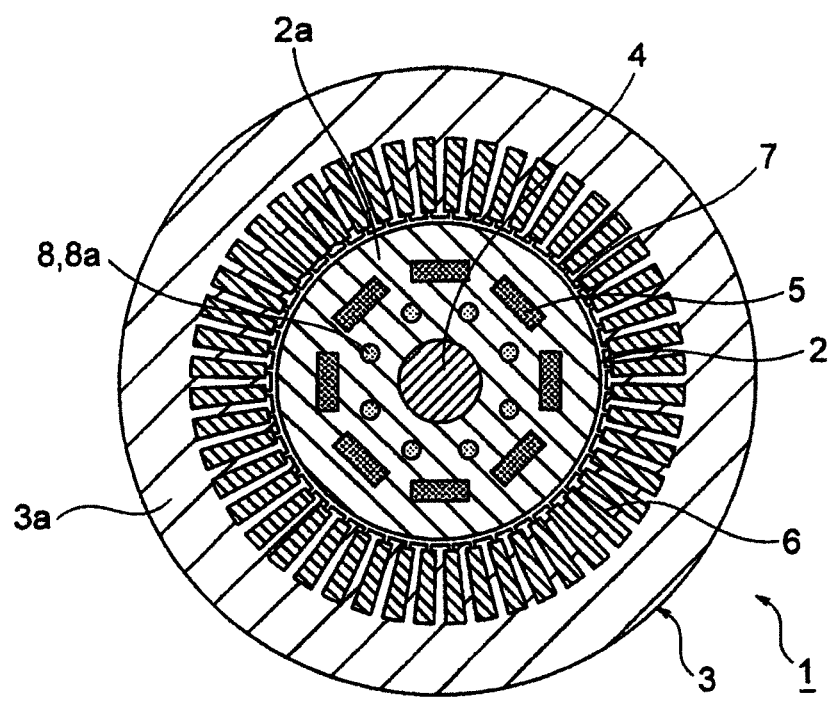
FIG. 1A is a schematic sectional view of an IPM motor including a rotor according to an embodiment of the invention.

Hereinafter, the present invention will be described based on the embodiments shown in FIGS. 1A, 1B1 and 1B2.

A motor 1 according to the present embodiment is an IPM motor including a rotor 2, a stator 3, and a shaft 4.

The rotor 2 has a rotor core 2a, and permanent magnets 5 are embedded in slots (not shown) respectively inside the rotor core 2a. End plates (not shown) are provided at both ends of the rotor 2 to constitute rotor surfaces 2b. The slots of the rotor 2 are sealed by the end plates. The end plates sealing the slots are not necessary when the fixing strength of the permanent magnets is sufficient.

The stator 3 includes stator core 3a and coil 6. The rotor 2 and the stator 3 are arranged via a gap 7 between the rotor and the stator. As will be described later, the coolant may pass through the gap 7 between the rotor 2 and the stator 3.

The rotor 2 is cooled by the coolant supplied from the cooling mechanism. Further, the stator 3 is also cooled in the same manner as the rotor 2.

The cooling mechanism may be a heat exchanger such as a radiator disposed outside the motor. In this case, the coolant supplied from the heat exchanger passes through coolant paths 8b formed on the rotor surfaces described later, the gap 7 between the rotor and the stator and/or coolant paths 8a formed inside the rotor 2. Thus, the coolant cools inside the motor 1 and is transported again to the heat exchanger outside the motor.

The kind of the coolant is not particularly limited, and a coolant that exhibits a suitable cooling function for the rotor 2 and the stator 3 may be selected. For example, it may be an oil, specifically, a cooling oil may be used. For example, mineral oil, chemically synthesized oil, etc. may be used. Further, not only a liquid but also a gas such as air may be used as the coolant.

To further enhance the cooling effect, it is preferable that coolant paths 8 (coolant paths 8a formed inside the rotor) through which the coolant passes are provided inside rotor 2 within a range that does not affect the properties of the IPM motor 1, and coolant paths 8 (coolant paths 8b formed on the rotor surface) through which the coolant passes is provided on the surface of rotor 2 within a range that does not affect the properties of the IPM motor 1. In addition, it is preferable that coolant paths 8 are located in proximity to permanent magnets 5 within a possible range. The distances between the coolant passing through coolant paths 8 and permanent magnets 5 are shortened, so that the cooling efficiency is enhanced. It is preferable to design the distances between coolant paths 8 and permanent magnets 5 to be within 10 mm or less.

Further, the coolant and the permanent magnets may directly contact without passing through coolant paths 8. In this case, the cooling effect can be further enhanced. The locations where the coolant paths are provided are not limited to inside or surface of the rotor. The coolant path may be provided inside the shaft, and may supply coolant from the coolant paths inside the shaft to coolant paths 8a formed inside the rotor and coolant paths 8b formed on the rotor surfaces.

The permanent magnets 5 are fixed in each of the slots (not shown) inside the rotor core 2a by such as resin (not shown). The fixing method is not limited to resin. For example, it may be fixed by the magnetic force of the permanent magnets itself or by brazing.

Thickness of the resin is preferably as thin as possible from the viewpoint of cooling efficiency, and may be less than 1 mm, or may be less than 100 μm. Kind of the resin is not particularly limited, but it is preferable to select a resin having high thermal conductivity to enhance the below-mentioned cooling effect. The thermal conductivity at room temperature may exceed 0.2 [W/m·K], and for instance, an epoxy resin in which fillers are dispersed can be mentioned. Resistivity of the resin is preferably 1×10$^5$ [Ω·m] or more, to suppress the below-mentioned eddy current.

Materials of a high thermal conductivity is preferable as the fillers to be dispersed. Thermal conductivity at room temperature may exceed 1 [W/m·K], and silica, alumina, etc. are exemplified. Further, thermal conductivity at room temperature may exceed 100 [W/m·K], and carbon, A1, etc. are exemplified.

Locations of permanent magnets 5 fixed in the slots inside the rotor core 2a is not particularly limited, and may be determined according to the desired motor properties. To obtain better motor properties, it is preferable to design rotor core 2a to locate permanent magnets 5 at positions where they are likely to be cooled.

The material of rotor core 2a is not particularly limited, but it is preferable to include a silicon steel sheet. In case of using the silicon steel sheet, it is possible to prepare rotor core 2a by laminating a plurality of the silicon steel sheets having holes serving as slots in the silicon steel sheets. Thickness of each of the silicon steel sheets in this case is not particularly limited, but it is preferably 0.25 mm or more and 0.50 mm or less from the viewpoint of easy temperature control. Also, it is preferable that thermal conductivity is high, and it may exceed 10 [W/m·K].

Permanent magnet 5 may be subjected to a surface treatment. For example, a coating film can be formed by plating, resin coating, oxidation treatment or chemical conversion treatment, etc. The coating film in this case preferably has a high thermal conductivity, and it may be 0.2 [W/m·K] or more. Thickness of the coating film may be 0.1 μm or more and 500 μm or less. As thickness of the coating film becomes thicker, corrosion resistance of permanent magnet 5 is more improved, and corrosion of permanent magnet 5 tends to be suppressed. On the other hand, as thickness of the coating film becomes thinner, it tends to prevent inhibition of thermal conduction by the coating film and tends to preferably maintain the cooling effect of the permanent magnet by the cooling mechanism. That is, in case of a permanent magnet having sufficient corrosion resistance, it is preferable to make the coating film thinner to increase the cooling efficiency in some cases, and it is preferable that there is no coating film in other cases.

For example, rotor core 2a (or an end plate), permanent magnet fixing members such as resin and/or coating films formed on the surface of the permanent magnets 5 are existing between the coolant paths 8a and the permanent magnet 5, formed inside the rotor. In this case, when the heat conductivity between the coolant paths 8a and the permanent magnets 5 inside the rotor is referred "X", the thermal conductivity of the rotor core 2a is referred A1[W/m·K], the thickness of the rotor core 2a existing between the coolant paths 8a and the permanent magnet 5 is referred a1[m], the thermal conductivity of the permanent magnet fixing member is referred A2[W/m·K], the thickness of the permanent magnet fixing member is referred a2[m], the thermal conductivity of the coating films formed on the surfaces of permanent magnets 5 is referred A3 [W/m·K], and the thickness of the coating film formed on the surface of the permanent magnets 5 is referred a3[m], "X" is represented by the following formula (1).

$$1/X = (a1/A1) + (a2/A2) + (a3/A3) \qquad \text{Formula (1):}$$

The unit of "X" is [W/m$^2$·K]. Note, A1, A2, A3, a1, a2 and a3 do not necessarily have to conform to the above definitions, and can be suitably set by inclusions existing between the coolant paths 8a and permanent magnets 5, respectively formed inside the rotor. When inclusions other than the above inclusions are present, the following quotient of the thickness and thermal conductivity are added: (a4/A4), (a5/A5), etc. On the contrary, when number of inclusions is small, it may be the followings: 1/X=(a1/A1) or 1/X=(a1/A1)+(a2/A2).

Further, the above-mentioned "X" can be calculated in the same manner as above, even if the coolant paths 8b are formed on the rotor surfaces, and it is the case between the coolant paths 8b and the permanent magnets 5. Also, the above-mentioned "X" can be calculated in the same manner as above, even if the coolant paths include the gap 7 between the rotor and the stator, and it is the case between the gap 7 and the permanent magnets 5.

In the present embodiment, from the viewpoint of enhancing the cooling efficiency, it is preferable that at least a part satisfies the following formula.

$$X=1000 \; [W/m^2 \cdot K]$$

High motor properties and a low cost are compatible in the present embodiment as described below.

Normally, the coolant is supplied to coolant paths 8b formed on the rotor surface, so that the temperature of the IPM motor 1 close to coolant paths 8b is similar to the coolant temperature. The coolant temperature is generally controlled by a heat exchanger (such as a radiator) to be approximately 20° C. or more and 80° C. or less. On the other hand, the temperature of a part, inside the IPM motor 1 and distant from coolant paths 8b, may rise from 100° C. or more to 200° C. or less depending on the use. That is, since the part is distant from coolant paths 8b, there is a high temperature part inside the IPM motor 1 and a low temperature part lower than the high temperature part.

In permanent magnet 5, there are a high temperature side permanent magnet part, located at a high temperature part inside the IPM motor 1, and a low temperature side permanent magnet part, located at a low temperature part where temperature is lower than the high temperature side permanent magnet part. The low temperature part is close to coolant paths 8b in the present embodiment. The temperature of permanent magnets 5 in the low temperature side permanent magnet part is lower than the temperature of permanent magnets 5 in the high temperature side permanent magnet part. Here, generally, as the temperature increases, HcJ of the permanent magnets 5 decreases. That is, in case of preparing the IPM motor 1 using the existing permanent magnets 5, HcJ of the low temperature side permanent magnet part close to coolant paths 8b becomes higher than the high temperature side when the IPM motor 1 is used.

However, even if HcJ of a part close to the coolant paths 8b, namely the low temperature side permanent magnet part, is high, an influence on motor properties of the IPM motor 1 is small, because the central part of the shaft mainly affects more on the motor properties. Therefore, considering the low temperature side permanent magnet part, the motor properties of the IPM motor 1 can be kept high even if it is replaced with a permanent magnet having lower HcJ. Generally, when HcJ of permanent magnets becomes lower, the cost also becomes lower. Therefore, by replacing the low temperature side permanent magnet part of permanent magnets 5 with the permanent magnets of lower HcJ, it is possible to realize the IPM motor 1 having high motor properties and a low cost.

A replacing ratio of permanent magnets 5 capable of being replaced with magnets having a low HcJ, while maintaining high motor properties of the IPM motor 1, depends on the temperature distribution generated in the permanent magnets 5 embedded in rotor 2 during the use of the IPM motor 1. Specifically, portions of permanent magnets 5 having lower temperature can be replaced with magnets with a lower HcJ (low cost) as shown in FIG. 1B2. Therefore, during the use of the IPM motor 1, when a large temperature difference generates in the permanent magnets 5, that is, when the temperature difference between the high temperature side permanent magnet part and the low temperature side permanent magnet part is large, it becomes easy to reduce the cost.

Also, in general, coercive force (HcJ) and residual magnetic flux density (Br) are properties contrary to each other. That is, as HcJ increases, Br tends to decrease. Conversely, as HcJ decreases, Br tends to increase. Therefore, high Br of permanent magnets 5 as a whole can be obtained by lowering HcJ of the low temperature side permanent magnet part of permanent magnets 5. Depending on the design of HcJ distribution of the permanent magnets 5, the output of the IPM motor 1 can be improved and higher motor properties can be obtained.

It is preferable that the temperature difference between the high temperature side permanent magnet part and the low temperature side permanent magnet part in permanent magnet 5 when using the IPM motor 1 is preferably at least 5° C. or more, and more preferably at least 10° C. or more. It depends on permeance of design, however, in areas, where temperature of the low temperature side permanent magnet part is lower by 5° C. than that of the high temperature side permanent magnet part during the use of the IPM motor, it can make HcJ at room temperature of the permanent magnet used at the low temperature side permanent magnet part lower by approximately 80 kA/m than that of the permanent magnet used at the high temperature side permanent magnet part.

Each of the permanent magnets 5 inserted into one slot provided in rotor core 2a may include a permanent magnet of a single body or permanent magnets of a plural bodies.

In case when each of the permanent magnets 5 inserted in each of the slots provided in rotor core 2a is a permanent magnet of a single body, it is essential that distribution in the HcJ exists in the same magnet. Preferably, the distribution of HcJ is similar to the distribution of the temperature distribution generated during the use of the IPM motor 1.

There are no restrictions on a method of adding distribution in HcJ inside the permanent magnet of a single body. A method that minimizes the cost may be selected. For example, a method of increasing HcJ of the grain boundary diffused part by grain boundary diffusion of the heavy rare earth element(s) (for example, Dy, Tb, etc.) in the permanent magnet is mentioned. As another example, a plurality kind of magnetic powders having different HcJ are prepared before pressing, a part of a low HcJ (the low temperature side permanent magnet part) is filled with the magnetic powder of low HcJ, and a part of a high HcJ (the high temperature side permanent magnet part) is filled with the magnetic powder of high HcJ, and then sintering after pressing thereof, is mentioned. Further, as another example, rare earth components are made to a liquid phase by sintering for a long time, a composition bias is generated inside the permanent magnet by such as surface tension, and then a permanent magnet having a distribution in HcJ is prepared, is mentioned.

In case when each of the permanent magnets 5 includes permanent magnets of a plural bodies, the permanent magnets of a plural bodies are inserted in one slot. It is preferable that the resistance between the permanent magnets inserted adjacent to each other in one slot is 1Ω or more, to cope with eddy current.

Preferably, a plurality of permanent magnets having different HcJ are placed so that distribution in HcJ becomes similar to the distribution in temperature generated during the use of the IPM motor 1. In addition, eddy current countermeasures may be applied by sandwiching an insulating layer between the permanent magnets.

A kind of the permanent magnets used as permanent magnets 5 is not particularly limited. It is preferable to use a rare earth magnet in consideration of a balance between properties and cost, and among them, it is preferable to use an R-T-B based permanent magnet. Note that "R" is one or more rare earth elements, "T" is one or more transition metal elements essentially including Fe or Fe and Co, and "B" is boron. B may be partly replaced by carbon.

Hereinafter, a method of producing the R-T-B based sintered magnet which is one of the R-T-B based permanent magnets used as permanent magnets 5 according to the present embodiment will be described, but well-known methods may be used as for matters not specifically described. Further, the method of producing the R-T-B based sintered magnet is not limited to the following method.

The R-T-B based sintered magnet according to the embodiment can be manufactured by a general powder metallurgy process. The powder metallurgy process includes a preparation process of preparing a raw material alloy, a pulverizing process of pulverizing the raw material alloy and obtaining raw material fine powder, a compacting process of pressing the raw material fine powder to prepare a green compact, a sintering process of sintering the green compact to obtain a sintered body, and an heat treatment process of applying an aging to the sintered body.

The preparation process is a process of preparing a raw material alloy having each element included in the rare earth magnet according to the present embodiment. First, such as a raw material metals including predetermined elements are prepared, and such as a strip casting method is carried out using thereof. Thereby, a raw material alloy can be prepared. Examples of the raw material metal include rare earth metals, rare earth alloys, pure iron, ferroboron, carbon, and alloys thereof. Raw material alloys are prepared using these raw material metals to obtain rare earth magnets having a desired composition.

Strip casting method will be described as an example of an preparation method. The strip casting method is conducted by the following. A molten metal is poured into a tundish, and from the tundish, the molten metal, in which the raw material metals, etc. is dissolved, is further poured onto a rotating copper roll whose inside is water-cooled, thereby it is cooled and solidified. Cooling rate when solidified can be controlled to a desired range by adjusting temperature of the molten metal, the supply amount, and the rotational speed of the cooling roll. The cooling rate at the time of solidification is preferably set appropriately according to the conditions such as the composition of the rare earth magnet to be manufactured, but it is preferably 500° C./sec. or more and 11000° C./sec. or less.

The pulverization process is a process of pulverizing the raw material alloy obtained in the preparation process to obtain raw material fine powder. This process is preferably carried out in two stages of a coarse pulverization process and a fine pulverization process, but it may be carried out in only one stage of the fine pulverization process.

The coarse pulverization process can be carried out in an inert gas atmosphere using such as stamp mill, jaw crusher, brown mill, etc. Hydrogen storage pulverization may be carried out. Hydrogen storage pulverization is a pulverization method in which dehydrogenation is carried out after absorbing hydrogen in a raw material alloy. In the coarse pulverization process, the raw material alloy is pulverized until it becomes coarse powder having a particle diameter D50 of approximately several hundred μm or more and several mm or less.

In the fine pulverization process, the coarse powder obtained in the coarse pulverization process (or raw material alloy in case of omitting the coarse pulverization process) is finely pulverized to prepare raw material fine powder having a particle diameter: D50 of approximately several μm. The average particle diameter of the raw material fine powder may be set in consideration of a degree of growth of the crystal grains after sintering. The fine pulverization can be carried out using such as jet mill.

Pulverization aid may be added before the fine pulverization. The addition of the pulverization aid improves pulverization properties, and facilitates a magnetic field orientation in the compacting process. Kind of the pulverization aid is not particularly limited. Oleic acid amide, lauric acid amide, etc. are exemplified. The addition amount of the pulverization aid is also not particularly limited. For example, it may be 0.05 wt % or more and 0.2 wt % or less.

The compacting process is a process of pressing the raw material fine powder in magnetic field to prepare the green compact. Concretely, the green compact is prepared by, after filling the raw material fine powder in a mold placed in an electromagnet, applying a magnetic field with the electromagnet to orient a crystal axis of the raw material fine powder, and pressurizing the raw material fine powder. Pressing in this magnetic field may be performed, for example, in a magnetic field of 1000 kA/m or more and 1600 kA/m or less, under a pressure of 30 MPa or more and 300 MPa or less.

The sintering process is a process of obtaining the sintered body by sintering the green compact. After pressing in the magnetic field, the green compact is sintered in a vacuum or in an inert gas atmosphere, and the sintered body can be obtained. The sintering conditions may be appropriately set according to the conditions such as the composition of the green compact, the pulverization method of the raw material fine powder, the particle diameter, etc.

The heat treatment process is a process of performing aging to the sintered body. The heat treatment may be carried out in a temperature range of 500° C. or more to 900° C. or less, and may be in two stages. The cooling rate after the heat treatment is not particularly limited. In addition, the heat treatment during grain boundary diffusion described below may also serve as the heat treatment process.

In the present embodiment, a process of grain boundary diffusion of the heavy rare earth element(s) to the sintered body may be included. In particular, when permanent magnet 5 inserted into one slot includes only one permanent magnet, the grain boundary diffusion of the heavy rare earth element(s) is effective when adding the distribution in HcJ in one permanent magnet.

The grain boundary diffusion is performed by firstly adhering the heavy rare earth element(s) to the surface of the sintered body, which is pretreated when necessary. The pretreatment is not particularly limited. The pretreatment in which etching is carried out by a known method, followed by washing and drying is exemplified.

Adhesion of the heavy rare earth element(s) is performed to the part which requires HcJ improvement and its vicinity. There are no limitations on the method of adhering the heavy rare earth element(s). For example, there are methods using evaporation, sputtering, electrodeposition, spray applying, brush applying, dispenser, nozzle, screen printing, squeegee printing, sheet method, etc.

The grain boundary diffusion can be carried out by performing heat treatment after adhering the heavy rare earth element(s). As a result, it is possible to further improve HcJ of the finally obtained R-T-B based sintered magnet, particularly HcJ at an area where the heavy rare earth element(s) are adhered.

There is no limitation on the heat treatment conditions during the grain boundary diffusion. Generally, heat treatment is performed in vacuum or inert gas. Heat treatment temperature and heat treatment time are also not particularly limited. For example, heat treatment may be performed at 800° C. or more and 1000° C. or less for 12 hours or more and 100 hours or less. After the heat treatment, aging may be carried out at 400° C. or more and 700° C. or less for one hour or more and 6 hours or less.

The R-T-B based sintered body obtained by the above processes may be subjected to surface treatment such as plating, resin coating, oxidation treatment, chemical conversion treatment, etc.

A method of producing the IPM motor 1 according to the present embodiment is not particularly limited, and a known method can be used.

In addition, the R-T-B based permanent magnet according to the present embodiment is not limited to the R-T-B based sintered magnet prepared by sintering. For example, it may be the R-T-B based permanent magnet prepared by hot pressing and hot working instead of sintering.

When cold green compacts obtained by pressing raw material powder at room temperature are hot pressed, pores remaining in the cold green compacts disappear, and can be densified without sintering. Further, by performing a hot extrusion processing as hot working to the green compacts obtained by hot pressing, the R-T-B based permanent magnet having a desired shape and magnetic anisotropy can be obtained.

Further, the application of the IPM motor 1 according to the present embodiment is not particularly limited. For example, it can be used not only for compressors such as air conditioners but also for compressors of automobiles, especially HV, HEV, FCV, etc.

Although the IPM motor 1 shown in FIGS. 1A, 1B1 and 1B2 has been described above, the invention is not limited to the IPM motor. For example, even a motor such as an SPM motor, a linear motor, a permanent magnet direct current motor, a voice coil motor, a vibration motor, etc. can be applied, if there is the temperature distribution in the motor.

Among the motors, the SPM motor will be described in comparison with the IPM motor with reference to the drawings. Items not specifically mentioned are the same as those of the IPM motor according to the present embodiment.

Figure 1C:
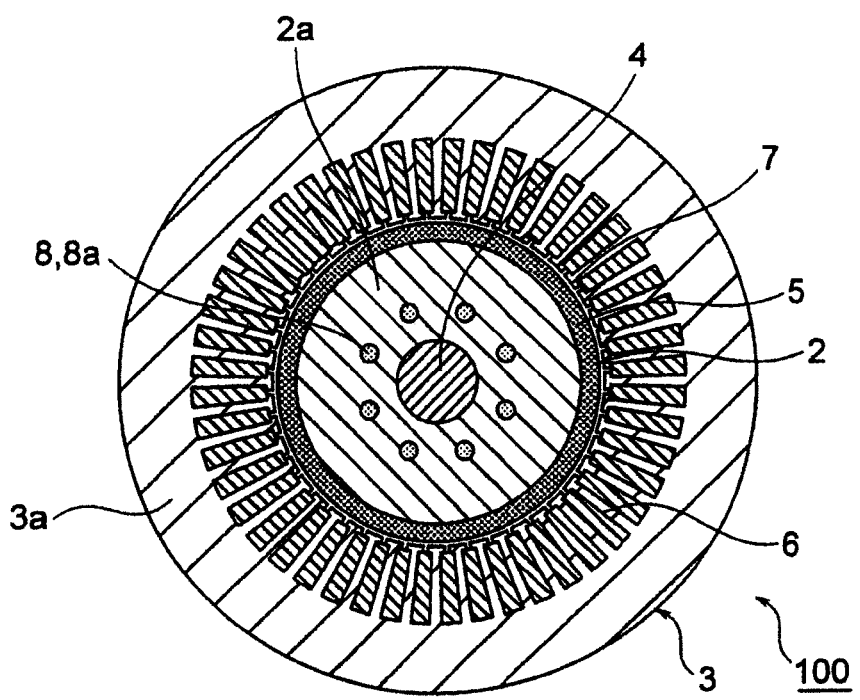
FIG. 1C is a schematic sectional view of an SPM motor including a rotor according to an embodiment of the invention.

In the SPM motor 100 shown in FIG. 1C, the positions of permanent magnets 5 are different from those of the IPM motor 1 shown in FIG. 1A. In the IPM motor 1, permanent magnets 5 are embedded inside the rotor 2, whereas in the SPM motor 100, the permanent magnets 5 are attached outside of rotor 2.

Figure 1D:
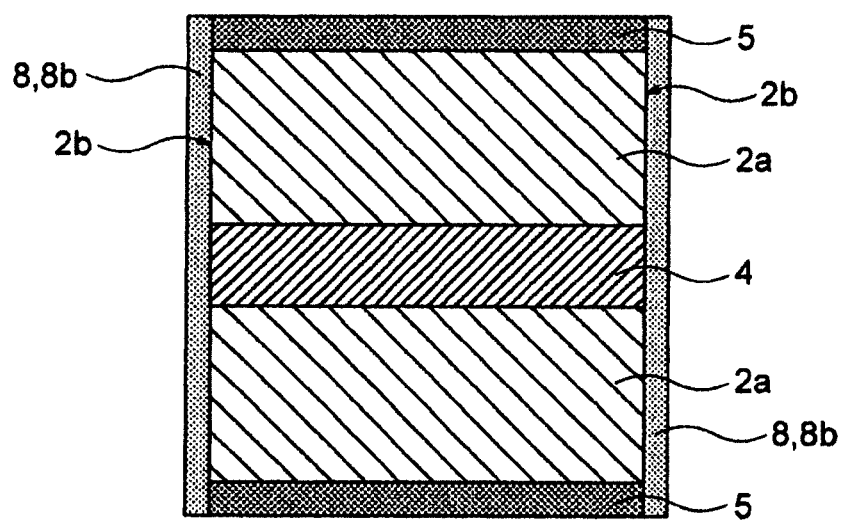
FIG. 1D is a schematic sectional view of the rotor viewed along the axial direction of the rotor in FIG. 1C.

As shown in FIGS. 1C and 1D, as in the same way to the IPM motor 1, in the SPM motor 100, the rotor 2 is also cooled by way of coolant paths 8b formed on the rotor surface, a gap 7 between the rotor and the stator, and coolant paths 8a formed inside the rotor.

The IPM motor 1 is particularly suitably used when a relatively high rotational speed is required. For example, it is particularly suitably used for a compressor of an air conditioner, a motor for driving a car, etc. On the other hand, the SPM motor 100 is particularly suitably used for applications requiring a relatively precise operation. For example, it is particularly suitably used for power steering, servomotor, etc.

EXAMPLE

Hereinafter, the present invention will be described in more detail with reference to examples and comparative examples, but the present invention is not limited thereto.

Example 1

Figure 2A:
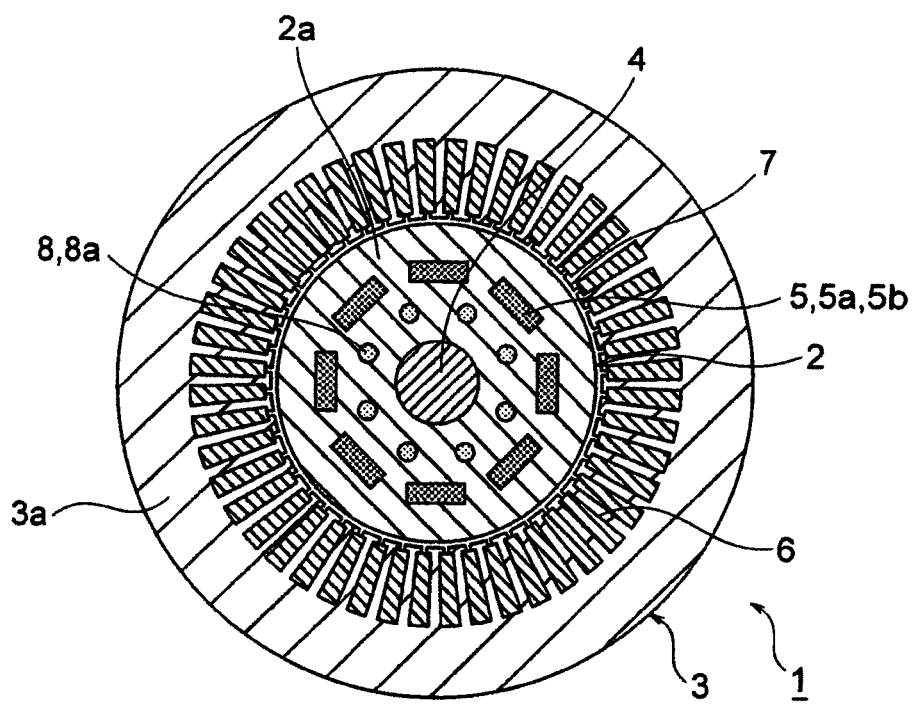
FIG. 2A is a schematic sectional view of an IPM motor including a rotor in Example 1.

An IPM motor 1 shown in FIGS. 2A and 2B1 was prepared. A plurality of coolant paths 8a were provided inside the rotor, and coolant paths 8b were also provided on the rotor surfaces. As a cooling mechanism, a radiator (heat exchanger) was used. The radiator was provided outside the IPM motor 1. Permanent magnets 5 of the IPM motor 1 were cooled by the coolant supplied from the radiator through the coolant paths 8b formed on the rotor surfaces, a gap 7 between the rotor and the stator, and the coolant paths 8a formed inside the rotor. Cooling oil was used as the coolant. During the use of the IPM motor 1, the radiator was controlled so that temperature of the cooling oil was always around 50° C. The cooling oil was circulated by the pump. The cooling oil transferred from the radiator to the IPM motor 1 passes through the gap 7 between the rotor and the stator and the coolant paths 8 (coolant paths 8a formed inside the rotor and coolant paths 8b formed on the surfaces of the rotor), and cooled inside of the IPM motor 1. The cooling oil was sent again to the radiator and cooled to around 50° C., and return to the IPM motor 1.

The size of each of the permanent magnets 5 was 50 mm×21 mm×3 mm. Each of the permanent magnets 5 was fixed to each of slots (not shown) by epoxy resin having carbon as fillers. In addition, plural permanent magnets in the same slot described below were also fixed by resin.

In Example 1, a part of the smallest distance between permanent magnets 5 and coolant is a part between coolant paths 8b formed on the rotor surfaces and the permanent magnets 5, and the distance was 0.9 mm. "X" of Formula 1 according to the part in Example 1 was approximately 4800 W/m²·K.

In Example 1, the R-T-B based sintered magnets having excellent properties and low cost were adopted as the permanent magnets 5. The size of each of the slots of rotor 2 was 50 mm×21.3 mm×3.3 mm considering ease of insertion of permanent magnets 5. Namely, the size of each of the slots is designed to be 0.3 mm longer in 21 mm side and the 3 mm side of each of the permanent magnets 5. The direction of 50 mm side of the slot was a direction parallel to shaft 4 of the IPM motor 1, and as shown in FIG. 2A, the direction of 3.3 mm side of the slot was the direction toward stator 3. The direction of 3.3 mm side of each of the slots was set to be the magnetization direction of each of the permanent magnets 5.

The electrical conductivity and the thermal conductivity of the R-T-B based sintered magnet do not change greatly even if HcJ of the R-T-B based sintered magnet is changed. Therefore, even in the case of inserting a plurality of permanent magnets in the same slot as in Example 1, basically it is possible to simulate a plurality of permanent magnets in the same slot as one permanent magnet 5 in the same slot. To select HcJ of the R-T-B based sintered magnet, the temperature distribution of the IPM motor 1 was simulated with a computer beforehand. The maximum temperature at a central part of one permanent magnet 5 when motor was driven at rotational number of 8000 rpm was 200° C. Also, one of the outermost part (the part where the permanent magnet 5 is exposed on one of the rotor surfaces 2b) in 50 mm side direction of the slot had a maximum temperature of 60° C. Assuming that the outermost part of the slot in the direction of 50 mm side is the origin (0 mm), 10 mm part in the direction toward the end of the slot along the shaft 4 was analyzed to have a maximum temperature of 140° C. and 20 mm part in the same direction to have a maximum temperature of 190° C. 25 mm part in the same direction (center part of the magnet) had the maximum temperature of 200° C., thereafter, 30 mm part had 190° C., 40 mm part had 140° C. and 50 mm part (the other outermost part of permanent magnet 2) had 60° C. Specifically, the temperature changed as shown in FIG. 2B2. This indicates that effect of cooling from coolant paths 8b (see FIG. 2B1) formed on the rotor surfaces is greater than the cooling from coolant paths 8a (see FIG. 2A) formed inside the rotor. The distance between coolant paths 8a and permanent magnets 5 was about 30 mm at the shortest. Calculating from this value, "X" between coolant paths 8a and permanent magnets 5 was approximately 750 W/m²·K, which was lower than "X" between coolant paths 8b and permanent magnets 5, which was approximately 4800 W/m²·K.

From this result, HcJ at a room temperature required for the R-T-B based sintered magnets used as permanent magnets 5 was calculated. As a result, the R-T-B based sintered magnets (hereinafter referred to as low HcJ magnets 5a) having HcJ of 1790 kA/m were adopted from one outermost part (0 mm) to 10 mm and from 40 mm to the other outermost part (50 mm). And from 10 mm to 40 mm, the R-T-B based sintered magnets (hereinafter, high HcJ magnets 5 b) having HcJ of 2007 kA/m were adopted. Br of the low HcJ magnets 5a was 1357 mT, and Br of the high HcJ magnets 5b was 1312 mT.

The low HcJ magnets 5a having HcJ of 1790 kA/m and Br of 1357 mT were prepared by performing strip casting on alloy α having the composition shown in Table 1 and subjecting thereof to hydrogen pulverization. After adding 0.1 wt % of oleic acid amide, the alloys were fine pulverized by jet mill in an atmosphere having an O (oxygen) content of 100 ppm or less, and fine powder α having a particle diameter: D50 of 3 μm was obtained. Fine powder α was filled in a mold and pressed in a magnetic field of 1500 kA/m. Green compacts were sintered at 1050° C. for five hours and processed to obtain two 10 mm×21 mm×3 mm sintered magnets. The direction of the magnetic field during pressing in the magnetic field was set to the direction parallel to the 3 mm side of the finally obtained sintered magnets. After the preparation of the sintered magnets, HcJ and Br were measured, and it was confirmed that HcJ was 1790 kA/m and Br was 1357 mT.

High HcJ magnets 5b having HcJ of 2007 kA/m and Br of 1312 mT were prepared by performing strip casting on alloy β having the composition shown in Table 1 and subjected thereof to hydrogen pulverization. After adding 0.1 wt % of oleic acid amide, the alloys were fine pulverized by jet mill in an atmosphere having the O content of 100 ppm or less, and fine powder β having a particle diameter: D50 of 3 μm was obtained. Fine powder β was filled in a mold and pressed in a magnetic field of 1500 kA/m. The green compacts were sintered at 1050° C. for five hours and processed by a processing machine to obtain 30 mm×21 mm×3 mm sintered magnets. The direction of the magnetic field during pressing in the magnetic field was set to the direction parallel to the 3 mm side of the finally obtained sintered magnets. After the preparation of the sintered magnets, HcJ and Br were measured, and it was confirmed that HcJ was 2007 kA/m and Br was 1312 mT.

The rare earth contents of fine powder α and fine powder β were confirmed. The rare earth content in alloy α and those in fine powder α were almost the same. The rare earth content in alloy β and those in fine powder β were almost the same.

Low HcJ magnet 5a and high HcJ magnet 5b were inserted into each of the slots, and rotor 2 and permanent magnets 5 (low HcJ magnets 5a and high HcJ magnets 5b) were fixed by a resin.

It is practically difficult to measure the actual internal temperature of the IPM motor 1 while the IPM motor 1 is being driven. Therefore, the IPM motor of Example 1, the IPM motor of Comparative Example 1 prepared in the same manner as Example 1 except low HcJ magnets 5a of 10 mm×21 mm×3 mm in Example 1 were all replaced by high HcJ magnets 5b and the IPM motor of Comparative Example 2 prepared in the same manner as Example 1 except high HcJ magnet 5b of 30 mm×21 mm×3 m in Example 1 was replaced by low HcJ magnets 5a were continuously rotated at 8000 rpm. Then, it was confirmed whether thermal demagnetization was generated by observing whether a decrease in output due to the driving time was shown. According to the simulation, in 30 minutes from the start of the test, temperature of permanent magnets 5 reaches the maximum temperature at 8000 rpm. Note that the output in this case is shown by "angular velocity×torque".

According to the IPM motor 1 of Example 1, the output immediately after the start of the test is set one. Table 2 shows results of the output change with respect to the time.

TABLE 1

|  | Nd (wt %) | Pr (wt %) | Tb (wt %) | Co (wt %) | Al (wt %) | Cu (wt %) | Zr (wt %) | Ga (wt %) | B (wt %) | Fe |
|---|---|---|---|---|---|---|---|---|---|---|
| Alloy α | 24.03 | 7.00 | 0.30 | 2.00 | 0.40 | 0.30 | 0.20 | 0.50 | 0.83 | balance |
| Alloy β | 24.01 | 6.99 | 1.01 | 2.00 | 0.40 | 0.30 | 0.20 | 0.50 | 0.83 | balance |
| Alloy A | 24.00 | 7.00 | 0.30 | 2.00 | 0.40 | 0.30 | 0.20 | 0.50 | 0.83 | balance |
| Alloy B | 24.00 | 7.00 | 1.00 | 2.00 | 0.40 | 0.30 | 0.20 | 0.50 | 0.83 | balance |
| Alloy C | 24.10 | 7.01 | 1.00 | 2.00 | 0.40 | 0.30 | 0.20 | 0.50 | 0.83 | balance |
| 30a1 | 23.91 | 6.95 | 0.99 | 2.00 | 0.40 | 0.29 | 0.20 | 0.50 | 0.83 | balance |
| 30b1 | 24.50 | 7.14 | 1.01 | 2.00 | 0.40 | 0.32 | 0.20 | 0.52 | 0.83 | balance |

TABLE 2

|  |  | High temperature side permanent magnet part | | Low temperature side permanent magnet part | | Output | | | | | |
| --- | --- | --- | --- | --- | --- | --- | --- | --- | --- | --- | --- |
|  |  | Coercive force | Residual magnetic flux density | Coercive force | Residual magnetic flux density | | | | | | |
|  |  | (kA/m) | (mT) | (kA/m) | (mT) | 0 min | 5 min | 10 min | 20 min | 30 min | 60 min |
| Ex. 1 | Ex. 1 | 2007 | 1312 | 1790 | 1357 | 1.000 | 0.999 | 0.998 | 0.998 | 0.997 | 0.997 |
|  | Comp. Ex. 1 | 2007 | 1312 | 2007 | 1312 | 0.987 | 0.986 | 0.986 | 0.985 | 0.985 | 0.984 |
|  | Comp. Ex. 2 | 1790 | 1357 | 1790 | 1357 | 1.020 | 1.013 | 0.999 | 0.901 | 0.875 | 0.874 |
| Ex. 2 | Ex. 2 | 2005 | 1350 | 1779 | 1361 | 1.018 | 1.017 | 1.017 | 1.017 | 1.016 | 1.015 |
| Ex. 3 | Ex. 3 | 2001 | 1316 | 1781 | 1360 | 1.003 | 1.002 | 1.002 | 1.001 | 1.001 | 1.000 |
| Ex. 4 | Ex. 4 | 2032 | 1310 | 1952 | 1326 | 0.989 | 0.988 | 0.988 | 0.987 | 0.987 | 0.987 |

In Example 1 and Comparative Example 1, the output did not substantially decrease over time. Only in Comparative Example 2, a remarkable reduction in output was observed over time. That is, it is considered that the permanent magnet was thermally demagnetized only in Comparative Example 2. Also, in Comparative Example 1, although the reduction in output over time cannot be observed, the output is small relative to Example 1. This is due to the following. A part of the magnet used in Comparative Example 1 has lower Br relative to that of the magnet used in Example 1, and flux of Comparative Example 1 is smaller than that of Example 1.

The cost of the R-T-B based sintered magnet changes depending on such as price fluctuation of the raw material, but in general, higher HcJ requires higher cost. Therefore, in comparison with Comparative Example 1 in which all of the R-T-B based sintered magnets are replaced by high HcJ magnet 5b, Example 1 in which some of the R-T-B based sintered magnets are replaced by low HcJ magnet 5a is low cost.

Further, in general, the HcJ and the Br are contrary to each other. Therefore, in comparison with Comparative Example 1 in which all of the R-T-B based sintered magnets are replaced by high HcJ magnets 5b, Example 1 in which some of the R-T-B based sintered magnets are replaced by low HcJ magnet 5a, has higher Br of permanent magnet 5. As a result, the flux increases, the output of the IPM motor 1 improves, and the performance of the IPM motor 1 improves.

Example 2

In Example 2, the R-T-B based sintered magnets having HcJ distribution inside were prepared using grain boundary diffusion method. Then, an IPM motor 1 was prepared in the same manner as Example 1, using the R-T-B based sintered magnets, each of which is a single body having HcJ distribution inside as the permanent magnet 5. Hereinafter, a method of producing the R-T-B based sintered magnets having HcJ distribution inside will be described in detail.

Alloy A having the composition shown in Table 1 was prepared by strip casting method and subjected thereof to hydrogen pulverization. After adding 0.1 wt % of oleic acid amide, the alloy was fine pulverized by jet mill in an atmosphere having the O content of 100 ppm or less, and fine powder A having a particle diameter of 3 μm was obtained.

The rare earth content of fine powder A was confirmed. The rare earth content of fine powder A was almost same with those of fine powder A.

Figure 3:
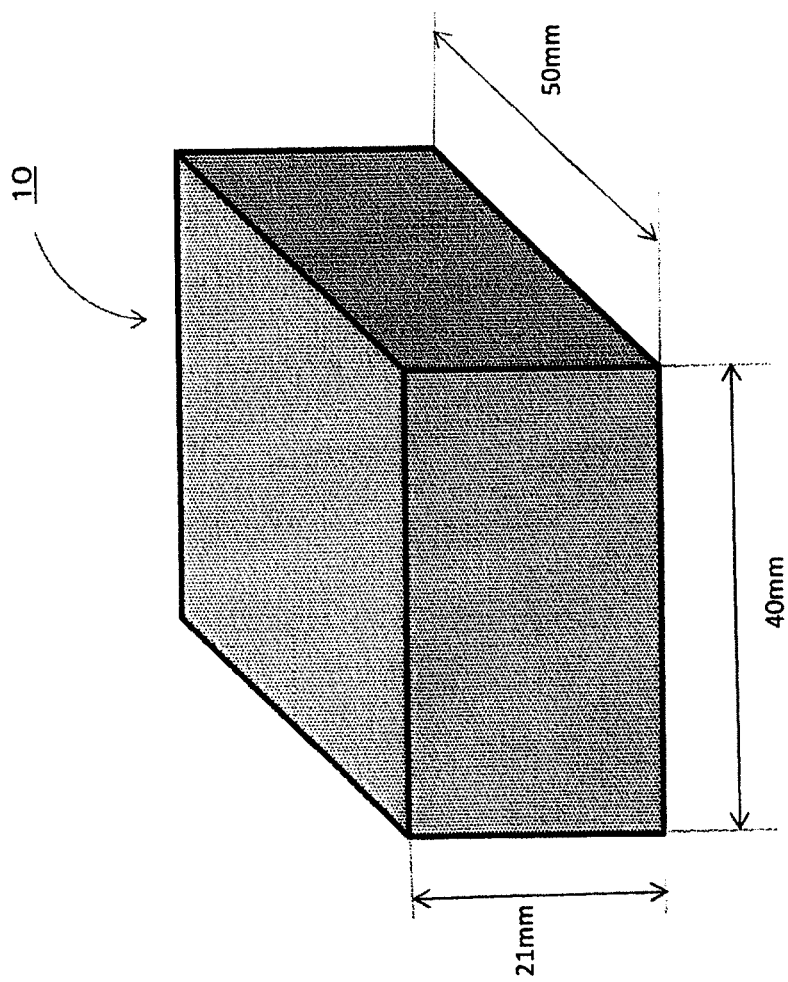
FIG. 3 is a schematic view of a sintered body in Example 2.

Fine powder A was filled in a mold and pressed in a magnetic field of 1500 kA/m to make a green compact. The green compact was sintered at 1050° C. for five hours and obtained a sintered body 10 of 50 mm×21 mm×40 mm shown in FIG. 3. The magnetic field application direction was parallel to the 40 mm side.

Figure 4:
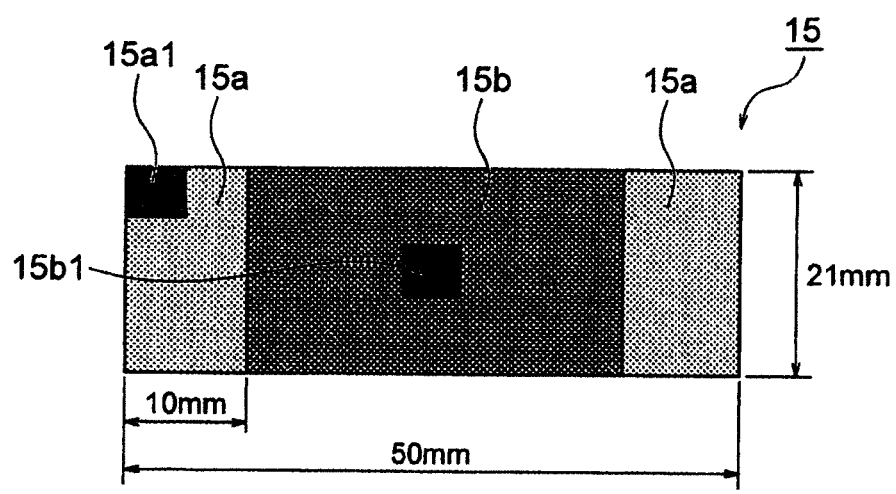
FIG. 4 is a schematic view of a surface (50 mm×21 mm) of a permanent magnet in Example 2.

The obtained sintered body 10 was sliced by a processing machine to obtain 10 pieces of permanent magnets of 50 mm×21 mm×3 mm. Then, as shown in FIG. 4, a Tb hydride adhering part was set from one end to 10 mm to 40 mm part 15b in longitudinal direction (50 mm direction) of the surface of 50 mm×21 mm, and Tb hydride ($TbH_2$) was adhered on the part 15b. Thereafter, diffusion was performed at 900° C. for 24 hours. After the diffusion, aging was carried out at 500° C. for one hour. The sintered body 15 subjected to the diffusion had low rare earth region 15a and high rare earth region 15b shown in FIG. 4 due to the effect of diffusion.

To confirm, a part of 3 mm×3 mm×3 mm was cut out from low rare earth region 15a and high rare earth region 15b, respectively, and sampled. Specifically, HcJ measurement parts 15a1 and 15b1 shown in FIG. 4 were sampled. As a result of measuring HcJ with a pulse-excitation-type magnetic property measurement apparatus, the sample cut out from low rare earth region 15a had HcJ of 1779 kA/m, and the sample cut out from high rare earth region 15b had HcJ of 2005 kA/m. Br of the sample cut out from low rare earth region 15a was 1361 mT and the sample cut out from high rare earth region 15b had Br of 1350 mT.

In FIG. 4, hatching is changed in low rare earth region 15a and in HcJ measurement part 15a1, but there is practically no difference as a substance. Similarly, hatching is changed in high rare earth region 15b and in HcJ measurement part 15b1, but there is practically no difference as a substance.

The R-T-B based sintered magnets obtained by the above method were incorporated in the IPM motor 1 as permanent magnets 5 of FIG. 2A in the same manner as in Example 1. Then the same test as in Example 1 was carried out. Good results shown in Table 2 were obtained.

Output of Example 2 is higher than that of Example 1, due to higher Br of Example 2 relative to that of Example 1 with the same HcJ, which is obvious from Table 2. Higher magnetic flux density with the same HcJ is considered an effect of using grain boundary diffusion method.

Example 3

An IPM motor 1 was prepared in the same manner as Example 1, using permanent magnets 5 having HcJ distribution inside. Hereinafter, a method of producing the R-T-B based sintered magnets used as permanent magnets 5 will be described in detail. Alloy A and alloy B, respectively having the composition shown in Table 1 were prepared by strip casting method and subjected thereof to hydrogen pulverization. Then, 0.15 wt % of oleic acid amide was added to each alloy. After the addition of oleic acid amide, the alloys were fine pulverized by jet mill under an atmosphere having the O content of 100 ppm or less, and fine powder A having a particle diameter: D50 of 3 μm and fine powder B having a particle diameter: D50 of 3 μm were obtained.

The rare earth contents of fine powder A and fine powder B were confirmed. The rare earth content in alloy A and that in fine powder A were almost the same. The rare earth content in alloy B and that in fine powder B were almost the same.

Figure 5:
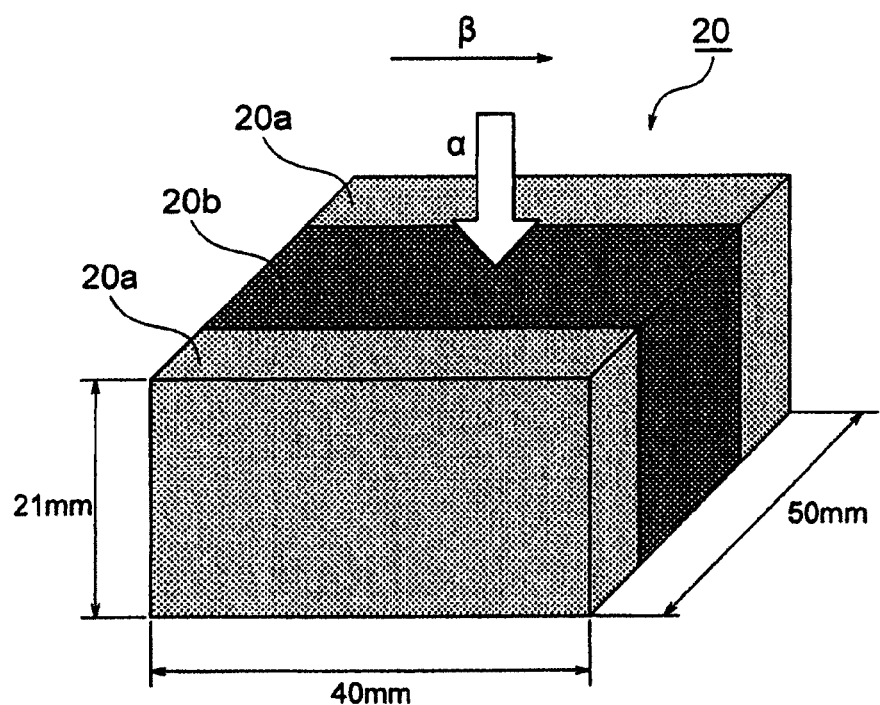
FIG. 5 is a schematic view of a green compact in Example 3.
Figure 6:
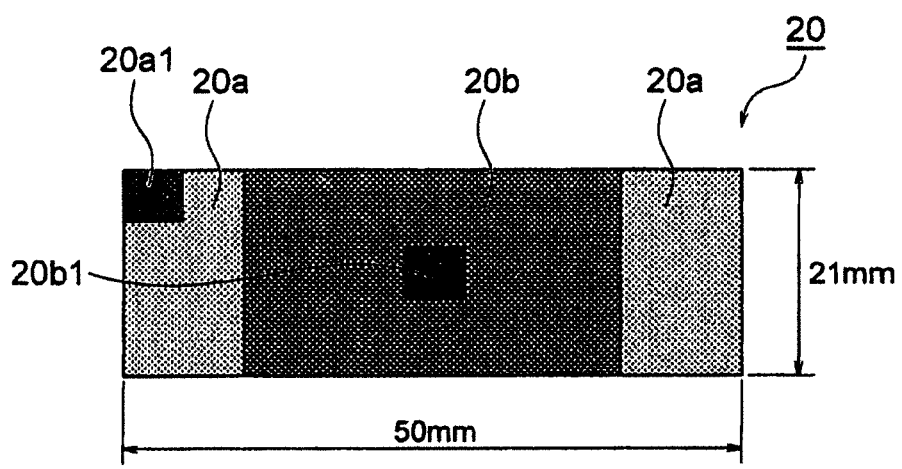
FIG. 6 is a schematic view of a surface (50 mm×21 mm) of a permanent magnet in Example 3.

Fine powder A and fine powder B were each filled in a mold in the manner shown in FIG. 5, and pressed thereof in the magnetic field. In FIG. 5, thick arrow α indicates a pressing direction and thin arrow β indicates a magnetic field applied direction. As shown in FIG. 6, the obtained green compact includes a region (hereinafter referred to as fine powder A region) 20a formed by fine powder A and a region (hereinafter referred to as fine powder B region) 20b formed by fine powder B. This green compact was sintered at 1050° C. for five hours and subjected to aging at 500° C. for one hour, then obtained the sintered body. The sintered body of 50 mm×21 mm×40 mm shown in FIG. 5 was sliced with a processing machine to obtain 10 permanent magnets of 50 mm×21 mm×3 mm. As shown in FIG. 6, each of the permanent magnets was processed to make fine powder A region 20a, fine powder B region 20b, and fine powder A region 20a from one end to the other end in the direction of 50 mm.

To confirm, a part of 3 mm×3 mm×3 mm was cut out from the fine powder A region 20a and fine powder B region 20b, respectively, and sampled. Specifically, HcJ measurement parts 20a1 and 20b1 shown in FIG. 6 were sampled. As a result of measuring HcJ with the pulse-excitation-type magnetic property measurement apparatus, the sample cut out from fine powder A region 20a had HcJ of 1781 kA/m, and the sample cut out from fine powder B region 20b had HcJ of 2001 kA/m. Br of the sample cut out from fine powder A region 20a was 1360 mT and the sample cut out from fine powder B region 20b had Br of 1316 mT.

In FIG. 6, hatching is changed in fine powder A region 20a and in HcJ measurement parts 20a1, but there is practically no difference as a substance. Similarly, hatching is changed in fine powder B region 20b and in HcJ measurement parts 20b1, but there is practically no difference as a substance.

The R-T-B based sintered magnets obtained by the above method were incorporated in the IPM motor 1 as permanent magnets 5 of FIG. 2A in the same manner as in Example 1. Then the same test as in Example 1 was carried out. Good results shown in Table 2 were obtained.

Example 4

An IPM motor 1 was prepared in the same manner as Example 1, using permanent magnets 5 having HcJ distribution inside, due to the composition bias inside the permanent magnets generated by sintering for a long time. Hereinafter, a method of producing the R-T-B based sintered magnets used as permanent magnets 5 will be described in detail. Alloy C having the composition shown in Table 1 was prepared by strip casting method and subjected thereof to hydrogen pulverization. Then, 0.15 wt % of oleic acid amide was added to the alloy. After the addition of oleic acid amide, the alloy was fine pulverized by jet mill under an atmosphere having the O content of 100 ppm or less, and fine powder C having a particle diameter: D50 of 3 μm was obtained.

The rare earth contents of fine powder C was confirmed. The rare earth content in alloy C and those in fine powder C were almost the same.

Figure 7:
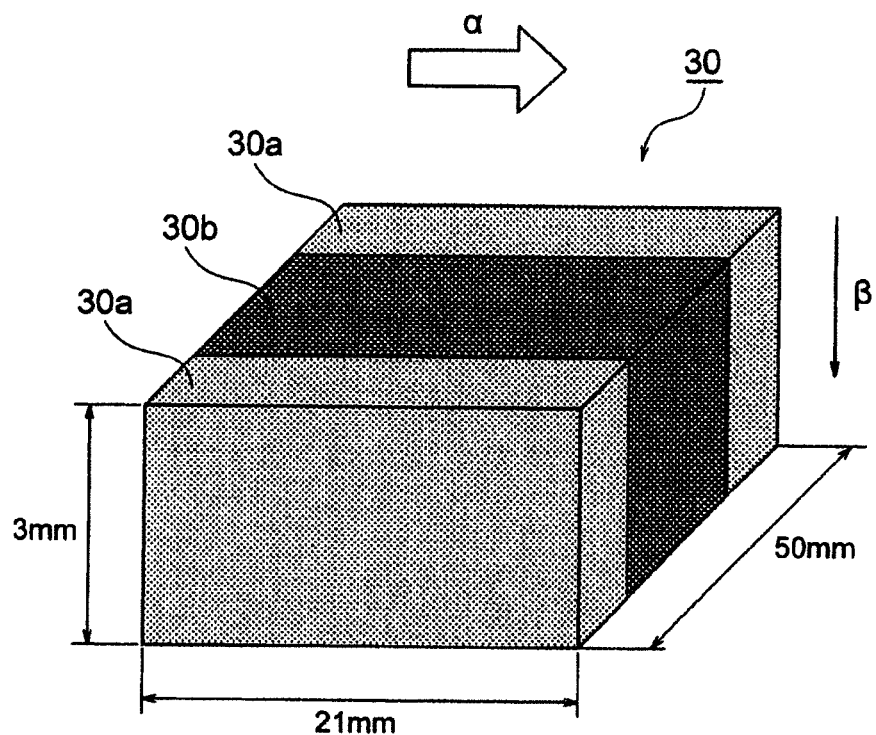
FIG. 7 is a schematic view of a sintered body in Example 4.

Fine powder C was filled in a mold in the manner shown in FIG. 7, and pressed thereof in the magnetic field of 1500 kA/m. In FIG. 7, thick arrow α indicates a pressing direction and thin arrow β indicates a magnetic field applied direction. The obtained green compact was sintered at 1050° C. for 24 hours and subjected to aging at 500° C. for one hour, then sintered body 30 is obtained. Composition of the obtained sintered body 30 was analyzed. The rare earth amount became higher toward the center of the sintered body, as described below. For convenience of explanation, as shown in FIG. 7, the permanent magnet (the sintered body 30) from one end to the other end in the 50 mm direction was defined as a low rare earth region 30a, a high rare earth region 30b, and a low rare earth region 30a.

Figure 8:
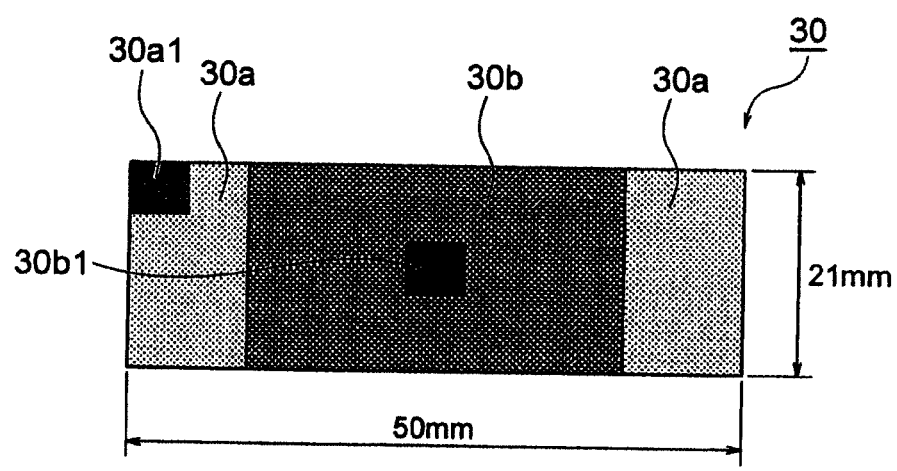
FIG. 8 is a schematic view of a surface (50 mm×21 mm) of a permanent magnet in Example 4.

To confirm, a part of 3 mm×3 mm×3 mm was cut out from low rare earth region 30a and high rare earth region 30b, respectively, and sampled. Specifically, HcJ measurement parts 30a1 and 30b1 shown in FIG. 8 were sampled. As a result of measuring HcJ with a pulse-excitation-type magnetic property measurement apparatus, the sample cut out from low rare earth region 30a had HcJ of 1952 kA/m, and the sample cut out from high rare earth region 30b had HcJ of 2032 kA/m. Br of the sample cut out from low rare earth region 30a was 1326 mT and the sample cut out from high rare earth region 30b had Br of 1310 mT.

Composition analysis of HcJ measurement parts 30a1 and 30b1 was carried out. As a result, as shown in Table 1, the rare earth content was different from that of alloy C at both HcJ measurement parts. This is because a part of the rare earth component which became a liquid phase by sintering for a long time has moved to the central part of the sintered body due to the surface tension.

The R-T-B based sintered magnets obtained by the above method were incorporated in the IPM motor 1 as permanent magnets 5 of FIG. 2A in the same manner as in Example 1. Then the same test as in Example 1 was carried out. Good results shown in Table 2 were obtained.

REFERENCES OF THE NUMERALS

1 . . . IPM motor
2 . . . Rotor
2a . . . Rotor core
2b . . . Rotor surface
3 . . . Stator
3a . . . Stator core
4 . . . Shaft
5 . . . Permanent magnet
5a . . . Low HcJ magnet
5b . . . High HcJ magnet
6 . . . Coil
7 . . . Gap between rotor and stator
8 . . . Coolant path
8a . . . Coolant path formed inside the rotor
8b . . . Coolant path formed on the rotor surface
10 . . . Sintered body
15 . . . Sintered body
15a . . . Low rare earth region 15b . . . High rare earth region
15a1, 15b1 . . . HcJ measurement part
20 . . . Green Compact
20a . . . Fine powder A region
20 b . . . Fine powder B region
20a1, 20b1 . . . HcJ measurement part
30 . . . Sintered body
30a . . . Low rare earth region
30b . . . High rare earth region
30a1, 30b1 . . . HcJ measurement part
100 . . . SPM motor

The invention claimed is:

1. A motor comprising a permanent magnet, wherein
the permanent magnet comprises a high temperature side permanent magnet part exposed to a high temperature inside the motor, and a low temperature side permanent magnet part exposed to a temperature lower than the high temperature inside the motor,
a coercive force of the high temperature side permanent magnet part is higher than the coercive force of the low temperature side permanent magnet part,
the motor comprises a cooling mechanism that cools inside of the motor,
the cooling mechanism comprises a coolant having a distance to the permanent magnet of 10 mm or less, the coolant being closer to the low temperature side permanent magnet part than to the high temperature side permanent magnet part, and
the low temperature side permanent magnet part being formed on two end surfaces of the permanent magnet, the permanent magnet being perpendicular to the axial direction of the rotor.

2. The motor according to claim 1, wherein difference between the coercive force of the high temperature side permanent magnet part and the coercive force of the low temperature side permanent magnet part is 80 kA/m or more.

3. The motor according to claim 1, wherein the permanent magnet has a distribution in the coercive force.

4. The motor according to claim 1, wherein the high temperature side permanent magnet part and the low temperature side permanent magnet part are included in the same single permanent magnet.

5. The motor according to claim 1, wherein a temperature difference of 5° C. or more is formed in the permanent magnet when using the motor.

6. The motor according to claim 1, wherein the permanent magnet is a rare earth magnet.

7. The motor according to claim 1, wherein the permanent magnet is an R-T-B based magnet.

8. The motor according to claim 1, wherein the coolant is oil.

9. The motor according to claim 1, wherein the motor is an IPM motor.

10. The motor according to claim 1, wherein the motor comprises a rotor, a stator and a shaft.

11. The motor according to claim 10, wherein the rotor comprises a rotor core, and the permanent magnet is embedded in a slot inside the rotor core.

12. The motor according to claim 11, wherein the rotor core comprises a silicon steel sheet.

13. The motor according to claim 11, wherein the permanent magnet is fixed in the slot by a resin.

14. The motor according to claim 13, wherein a thickness of the resin is less than 1 mm.

15. The motor according to claim 13, wherein a thermal conductivity of the resin at room temperature is more than 0.2 [W/m·K].

16. The motor according to claim 13, wherein a resistivity of the resin is $1 \times 10^5$ [Ω·m] or more.

17. The motor according to claim 1, wherein a coating film is formed on the permanent magnet.

18. The motor according to claim 17, wherein the thermal conductivity of the coating film is 0.2 [W/m·K] or more.

19. The motor according to claim 17, wherein the thickness of the coating film is 0.1 μm or more and 500 μm or less.

20. The motor according to claim 1, wherein coolant paths are provided inside the rotor.

* * * * *